US010116904B2

(12) United States Patent
Addy

(10) Patent No.: US 10,116,904 B2
(45) Date of Patent: Oct. 30, 2018

(54) FEATURES IN VIDEO ANALYTICS

(75) Inventor: Kenneth L. Addy, Massapequa, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1290 days.

(21) Appl. No.: 11/777,826

(22) Filed: Jul. 13, 2007

(65) Prior Publication Data
US 2009/0015671 A1   Jan. 15, 2009

(51) Int. Cl.
H04N 7/18 (2006.01)
H04N 21/4223 (2011.01)
(Continued)

(52) U.S. Cl.
CPC ......... *H04N 7/181* (2013.01); *H04N 21/4223* (2013.01); *H04N 21/4334* (2013.01);
(Continued)

(58) Field of Classification Search
CPC .............................. H04N 7/181; H04N 7/183
(Continued)

(56) References Cited

U.S. PATENT DOCUMENTS

2006/0170769 A1\* 8/2006 Zhou .............................. 348/143
2006/0176951 A1\* 8/2006 Berman et al. .......... 375/240.01
(Continued)

FOREIGN PATENT DOCUMENTS

GB    2 408 878 A    6/2005
WO   WO 2006/086141 A2   8/2006

OTHER PUBLICATIONS

Li et al., "A Hidden Markov Model Framework for Traffic Event Detection Using Video Features", Mitsubishi Research Laboratories, (TR-2004-084), Oct. 2004.
(Continued)

*Primary Examiner* — Alan S Chou
(74) *Attorney, Agent, or Firm* — Husch Blackwell LLP

(57) ABSTRACT

A video analytics function is disclosed for use in a video monitoring applications to control and monitor streaming video from a video source arranged to monitor a field of view (FOV) and providing for end-user input to identify and modify a compression level of at least one object or area field encompassing the field of view (FOV) based on a monitoring priority of the at least one object. The inventive operation realizes reduced bandwidth and processing requirements for monitoring the FOV because of a reduction in streaming video data based on the compression level, which includes a fully-masked compression level. The novel function provides for reconstructing the FOV for viewing at an end-user interface, e.g.' a remote workstation, and inputting end-user commands at the end-user interface to create an object field encompassing the at least one object or area field within the FOV. The compression level is defined based on a monitoring priority for the at least one object, or object field area. The bandwidth needed to transfer video comprising the FOV and compressed object fields, and the processing required to process the FOV and object fields is reduced in accord with the user-defined compression level of the object field data. The FOV is then monitored.

23 Claims, 2 Drawing Sheets

Figure 1:
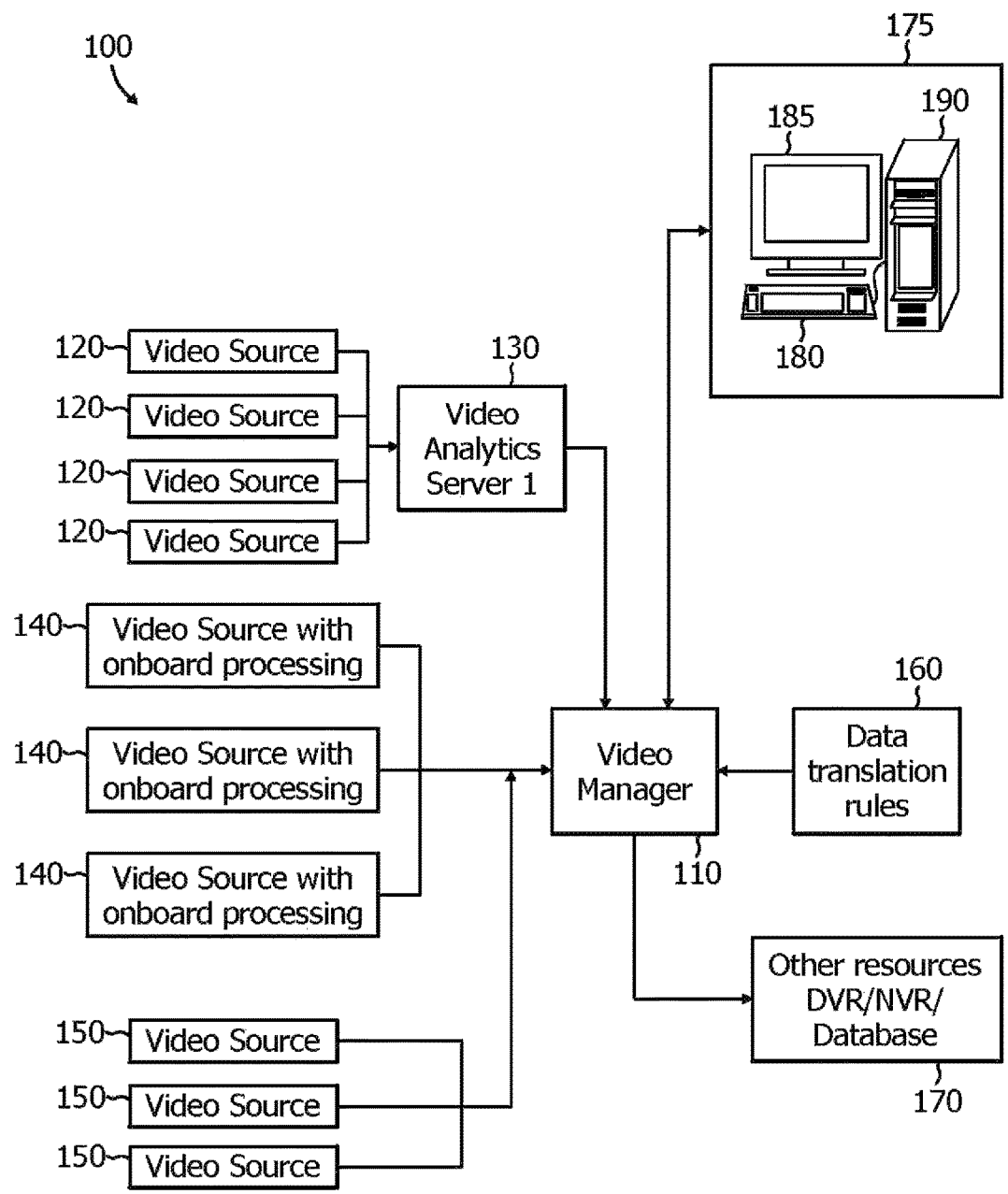

(51) Int. Cl.
*H04N 21/433* (2011.01)
*H04N 21/44* (2011.01)
*H04N 21/4402* (2011.01)
*H04N 21/442* (2011.01)
*H04N 21/4728* (2011.01)
*H04N 21/643* (2011.01)
*H04N 21/6587* (2011.01)

(52) U.S. Cl.
CPC . *H04N 21/44008* (2013.01); *H04N 21/44209* (2013.01); *H04N 21/440254* (2013.01); *H04N 21/4728* (2013.01); *H04N 21/643* (2013.01); *H04N 21/6587* (2013.01)

(58) Field of Classification Search
USPC .................................................. 348/143, 159
See application file for complete search history.

(56) References Cited

U.S. PATENT DOCUMENTS

2006/0239645 A1 10/2006 Curtner et al.
2007/0039030 A1* 2/2007 Romanowich et al. ...... 725/105

OTHER PUBLICATIONS

Li et al., "Boundary-Control Vector (BCV) Motion Field Representation and Estimation by Using a Markov Random Field Model * Ms. No. F001-Hs01, (Revised)", Sep. 4, 1995.
Achanta et al., "Compressed Domain Object Tracking for Automatic Indexing of Objects in MPEG Home Video", IEEE, 2002.
Gorry Fairhurst, IP Packet Header; J. Postel, Internet Protocol, RFC 791, http://www.erg.abdn.ac.uk/users/gorry/course/inet-pages/ip-packet.html, Dec. 17, 2003.
Honeywell Digital Video Manager User Guide, Release 200, Document ZD36-003-200, Sep. 2005.
DVIR Doron ioIMAGE, Ltd., Top Transport Vehicle Manufacturer, Merkavim, Deploys ioIMAGE Intelligent Video for Preventing Scrap Metal Theft, Herzliya, Israel, Press Release Apr. 10, 2006.
DVIR Doron loIMAGE, Ltd., ioIMAGE to Showcase Performance-Breaking Intelligent Video Solutions as the Texas Instruments Developer Conference, Dallas, Press Release Feb. 28, 2006.
Yahan Wu www.eyeonfly.nl, North Holland Warehouse Relies on Virtual Security, www.asmag.com, Sep. 15, 2006.
Chelsie Woods, ioIMAGE, Ltd., ioimage Announces Launch of U.S. Operations, ioimage intelligent video applicances (TM), www.ioimage.com, Hackensack, NJ, Press Release, Jul. 11, 2006.
Dr. Yehiel Milman, ioIMAGE, Ltd., Video Surveillance from Dumb to Smart, SecurityWorld Int'l, pp. 97-99, May-Jun. 2005.
Cutting Costs While Strengthening Overall Security and the Airport Perimeter, www.ioimage.com, Sep. 17, 2006.
Not Just for High Security: A Look at How Video Analytics Can Find Value at Your Industrial Facility, www.ioimage. com, Sep. 17, 2006.
Ora Coren et al., Two local companies offer hi-tech obstacle detection for railways, http://www.haaretz.com/hasen/spages/726781.html, Jun. 14, 2006.
Ioimage video analytics a one-way ticket to safer and more secure rail systems, www.ioimage.com, Sep. 17, 2006.
Ioiboxes hold the line for Action Non Food B.V. Distribution Warehouse, www.ioimage.com, Sep. 19, 2006.
Knesset—Israel Parliament Case Study, iwww.ioimage.com, Sep. 19, 2006.
Top Transport Vehicle Manufacturer Uses Intelligent Video to Prevent Intrusion and Scrap Metal Theft, iwww.ioimage.com, Sep. 19, 2006.
Ioi box, Intelligent Video Encoder Series, ioimage intelligent video applicances (TM), ioicw2647461, iwww.ioimage.com, Sep. 20, 2006.
Ioi camwdc100dn Ultra-Wide-Dynamic-Range Color Day/Night Intelligent-Video IP Camera, ioimage intelligent video applicances (TM), ioicw2647461, iwww.ioimage.com, Sep. 20, 2006.
Company Overview, ioimage intelligent video applicances (TM), iwww.ioimage.com, Sep. 20, 2006.
Company Overview, products, ioimage intelligent video applicances (TM), iwww.ioimage.com, Sep. 20, 2006.
Ioi ware command center, Command and Control Software, ioimage intelligent video applicances (TM), iwww.ioimage.com, Sep. 20, 2006.
U.S. State Department Selects ioimage's Intelligent Video Solution for Homeland Security Application, ioimage intelligent video applicances (TM), iwww.ioimage.com, Hackensack, NJ, Aug. 23, 2006.
Ioi video analytics, Rule-Driven Detection Modules, ioimage intelligent video applicances (TM), iwww.ioimage.com, Sep. 25, 2006.
Fiona Ungar ioIMAGE, Ltd., Ioimage Debuts First ioicam Turn-Key Intelligent Video IP Surveillance Camera, ioimage intelligent video applicances (TM), iwww.ioimage.com, Herzliya, Israel, Press Release, Sep. 25, 2006.
Gorry Fairhurst, IP Packet Processing, Transmission of a frame over Ethernet, http://www.erg.abdn.ac.uk/users/gorry/course/inet-pages/ip-processing.html, Feb. 11, 2006.
Sony Intelligent Video Analytics—Distributed Enhanced Processing Architecture (DEPA), IP Video Monitoring Systems—Technical Documentation, version 1.0, Dec. 2006.
Gorry Fairhurst, IPv4 Packet Header; J. Postel, Internet Protocol, RFC 791, http://www.erg.abdn.ac.uk/users/gorry/course/inet-pages/ip-packet.html, Nov. 18, 2008.

* cited by examiner

FEATURES IN VIDEO ANALYTICS

BACKGROUND OF THE INVENTION

The present invention relates to video analytics for video monitoring system applications, and more particularly relates to a new and novel video analytics function and module that enables an end-user of a video monitoring system comprising the novel function to identify objects in an imaging field of view (FOV) acquired as steaming video from a video source, define a border around the object as an object field definition, and the further define an amount of compression for the data comprising the identified object field. As such, each subsequent frame of the captured FOV (the streaming video) and object field are forwarded from the video source, where the data comprising the user-defined object field definition is reduced compared to the other FOV video data commensurate with the user-defined compression level for the object field. The inventive operation minimizes the bandwidth required to transfer the streaming video, and for processing the streaming video for surveillance purposes, and preferably nevertheless monitors the compressed object field in the FOV by use of a motion vector derived from the object field.

Video surveillance systems are known for use in a variety of applications for monitoring objects within an environment, e.g., a piece of baggage or a casino employee. Analog closed circuit television (CCTV) monitoring systems have been in operation for many years. These legacy analog-based CCTV systems, and more recently available network-based video surveillance systems are employed to monitor and/or track individuals and vehicles entering or leaving a building facility or security gate (entry/exit), individuals present within, entering/exiting a store, casino, office building, hospital, etc., or any other known setting where the health and/or safety of the occupants may be of concern. Video surveillance has long been employed in the aviation industry to monitor the presence of individuals at key locations within an airport, such as at security gates, baggage area, parking garages, etc.

CCTV-acquired image data has traditionally been recorded to videocassette recorders (VCRs) in CCTV, or hybrid CCTV/digital network-based surveillance systems. But the recent improvements in digital technology and digital network technology have lead to marked improvements in digital network-based surveillance systems. Such improvements include storing digital or digitized video data via digital video recorders (DVRs), or network video recorders (NVRs). CCTV cameras, however, because of their analog construction and operation, are notoriously difficult to integrate with conventional networks and systems. That is, many legacy CCTV-based video surveillance systems are modified to operate in the digital world, wherein the CCTV cameras' on-board processes must digitize the video data streams to operate as part of the digital network, or the Internet.

The phrases "network camera," "video camera" or "video source" are used interchangeably herein to denote and describe video capture or video acquisition devices that may take the form of any of digital cameras, digital video recorders, analog CCTV cameras, etc., streamers, including video devices that include on-board servers and/or on-board video analytics known in the art for capturing a monitoring field of view (FOV) for a monitoring application. Digital network cameras perform many of the same functions performed by conventional analog CCTV cameras, but with greater functionality and reduced costs. Network cameras are typically interfaced directly into an Ethernet-based network at an Ethernet port through a video server (as mentioned above), a monitor either a fixed or moving FOV. Network camera video outputs may be viewed in their simplest form using a web browser at a PC (and PC monitor). Alternatively, the video feed from a network camera may be processed to accommodate more complex security-related solutions using dedicated software and application programs.

Video servers, or servers that provide video analytics functionality, may be included in a video surveillance system or network in order to process video provided by the network cameras. Video servers may be used in video management systems to operate upon analog CCTV video data, such operations including digitization, rasterization and processing by video analytics. Such video servers thereafter direct the video data to in-network or IP address locations, such as a video client. A single video server may network up to four analog cameras, converting the analog stream to frames of digital image data. Network or IP Cameras with on-board video analytics processing abilities shall be referred to herein as "smart IP cameras," or smart video sources. Smart IP cameras or video sources allow for video analytics to be performed at the source of video data acquisition, that is, at the camera.

Video sequences, or streaming video acquired by network cameras of monitoring FOVs, both digital and analog, comprise frames of images of an FOV, and are streamed over the network using TCP/IP protocols and the like. The video streams are directed to distant servers (for example, by the streams' intended MAC address), or other video clients where the video surveillance data are analyzed by the server or video client applications using various known video analytics. Alternatively, the streaming video may be stored in a video database, and later accessed by video clients. Video analytics as used herein shall refer to functional operations performed by a video source to acquire video surveillance data, and performed on acquired video data by software or application programs that employ algorithms to detect classify, analyze objects in a field of view (FOV), and respond to such detection, classification and analyzing.

Video analytics are used in various conventional video-monitoring systems to enhance the effectiveness of the video monitoring for event and object detection, and reporting. Video analytics include various functions that provide for improved monitoring vigilance, improved video acquisition device functionality, monitoring functionality and analysis, and automated video monitoring system responsiveness. Known video analytics provide object-tracking features by which an object under surveillance is tracked or monitored by a camera. For example, video analytics may support video monitoring by analyzing streaming video surveillance data including an object under surveillance to detect if the object's position changes, e.g., the object has been removed from the location. If the object is moved, an alarm will generally be raised.

Various entities are known that provide video monitoring systems and software applications for video monitoring applications that include video analytics functioning. For example, IOImage, Inc., provides video analytics solutions marketed Intelligent Video Appliances,™ which performs various security-monitoring functions upon acquired video surveillance data. The Several Intelligent Video Appliances™ functions include without limitation intrusion detection by video surveillance, unattended baggage detection, stopped vehicle detection, and other video analytics functions such as autonomous person/vehicle tracking with pan/tilt/zoom (PZT).

Known video surveillance systems and video analytics techniques provide for monitoring high-risk environments such as airports, as mentioned above, but may be used as well in "home" video surveillance monitoring, traffic flow monitoring to monitor driver action at fixed street or highway locations, etc. Highway video surveillance operation is discussed at length in a paper by Li, et al., A HIDDEN MARKOV MODEL FRAMEWORK FOR TRAFFIC EVENT DETECTION USING VIDEO FEATURES; Mitsubishi Research Laboratories, (TR-2004-084; October 2004). Therein, a video analytics approach to highway traffic detection is described in which the video analytics extract features directly from compressed video to detect traffic events using a Gaussian hidden Markhov model (HMM) framework. The approach uses MPEG compression to reduce spatial redundancy between successive frames, the result of which is stored in a motion vector (MV) in video. MVs may describe an object found in acquired video frames in the spatial domain, where the magnitude of MV reflects the speed of the moving object and its direction indicates the moving direction of the moving object.

Another known video surveillance system and application is disclosed in US Patent Application No. 2006/0239645 ("the '645 application"), filed Mar. 31, 2005, commonly owned and incorporated by reference. The '645 application discloses an enterprise video surveillance system that includes video analytics abilities, including the ability to package video sequences derived from network cameras based on user-specified events. A video analytics processing manager, or Digital Video Manager™ ("DVM"), provides for portions of acquired video, e.g., acquired video sequences, to be bound into a "package" containing an event of interest captured by a digital video system sensor or video camera. DVM is a scalable, enterprise class IP-based digital video manager system that includes a network video recorder (NVR) capable of transforming standard IT equipment and component video sources into customized and manageable video systems for security and surveillance needs.

The packaged video sequences or events are transmitted by the DVM to an external agent (video client) for further analysis, for example, to a central monitoring location within the enterprise video surveillance system. One example of a video event that may be packaged by the DVM system includes a video clip containing facial images of an individual under surveillance, or enter/exiting a secured location. By packaging the video event in order that the segment is easily accessed, prompt security agent action may be taken with respect to the monitored individual's actions, etc. To that end, Honeywell's DVM systems include video analytics ability to provide relevant acquired or captured video data on demand, implement outdoors motion detection, conduct object tracking, conduct object tracking with classification, etc.

What would be welcomed in the field of enterprise-wide video surveillance, and video analytics-based video surveillance systems is a video analytics function that enables an end-user to identify objects in an imaging field of view (FOV) acquired by a video source that are not a priority, and limit the video data comprising the object in the frame of FOV, to minimize the amount of data transferred and processed. For that matter, it would be desirable to have a user option to define an amount of compression for the data comprising the identified object. Whereafter, each subsequent frame of the FOV would have a size equal to the data comprising the FOV set off by the compression ratio of the object data (in the streaming video). Such operation realizes a desirable effect of minimizing the bandwidth required to transfer the streaming video, and for processing the streaming video for surveillance purposes.

SUMMARY OF THE INVENTION

To that end, the present invention provides a novel video analytics function or functional module, a video surveillance method and system that implement the function.

In one embodiment, the novel video analytics function provides an end-user with an ability to control an amount of streaming video data from a video source by compressing or partially compressing video data comprising low-threat or low-priority objects, or low priority areas or regions within a field of view (FOV) that have been identified by the system user. By compression, it should be understood to mean compression at various compression levels, which includes compression that fully masks an object within the FOV. Once masked or compressed, the data in the object field definition may be monitored differently than other video data comprising the FOV.

The low-priority regions should be identified by the system user to accommodate a particular surveillance application. Any known input device that will allow an system user an ability to both view the FOV, and insert and field boundary about an area, or object that does not require "full" video monitoring (no compression). In addition, however, in systems with sophisticated video analytics ability that automatically identify and distinguish objects, for example, by an object's aspect ratio, may interact with the novel function of the invention, where the system user is automatically given the option of compressing the objects so identified by the conventional analytics.

For example, when an object or specifically identified area within a streaming FOV that is not essential for an immediate surveillance application is masked, or partially compressed by user input and the novel function, an operator may focus his/her attention on other portions of the streaming imaged FOV. The novel function may mask or partially compress the object field data (as defined by the object field definition) until the end-user modifies the compression level, or until video analytics detect some event in the partially compressed data that changes the monitoring priority with respect to the identified object, or object field. The object field definition is not limited by the invention to objects per se, but to specific areas that once identified are defined as area fields, which are equivalent of an object field definition. For that matter, the terms "area field definition," and object field definition are used interchangeably herein to convey the concept of a captured portion of a streaming video field of view, for purposes of minimizing the video data forwarded from the source tracking the area, field or object.

When monitoring a streaming video FOV that includes an object field defined by an end-user in fully compressed mode, an event occurring (and detected by video analysis) somewhere in the FOV outside the object field definition, or by analyzing a motion vector representative of the fixed and fully compressed object field will compel the system to automatically modify the compression level of the masked object field definition. Where the object field is partially compressed rather than masked, the compressed data may be analyzed, for example, for a detectable event in the partially compressed video data that would change the priority for the object field, and consequently change the level of compression and monitoring for the object or objects therein.

DESCRIPTION OF THE DRAWING FIGURES

Figure 2:
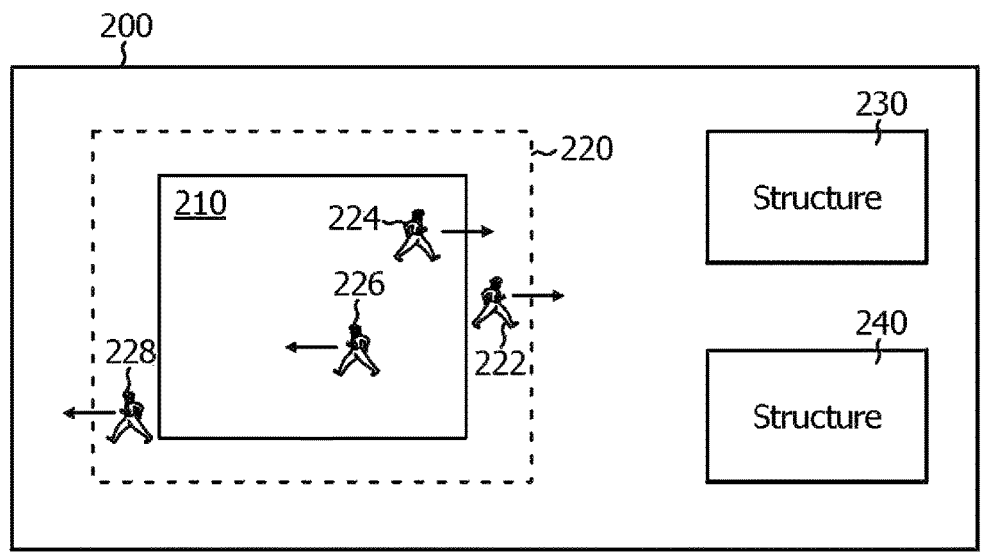
Figure 3:
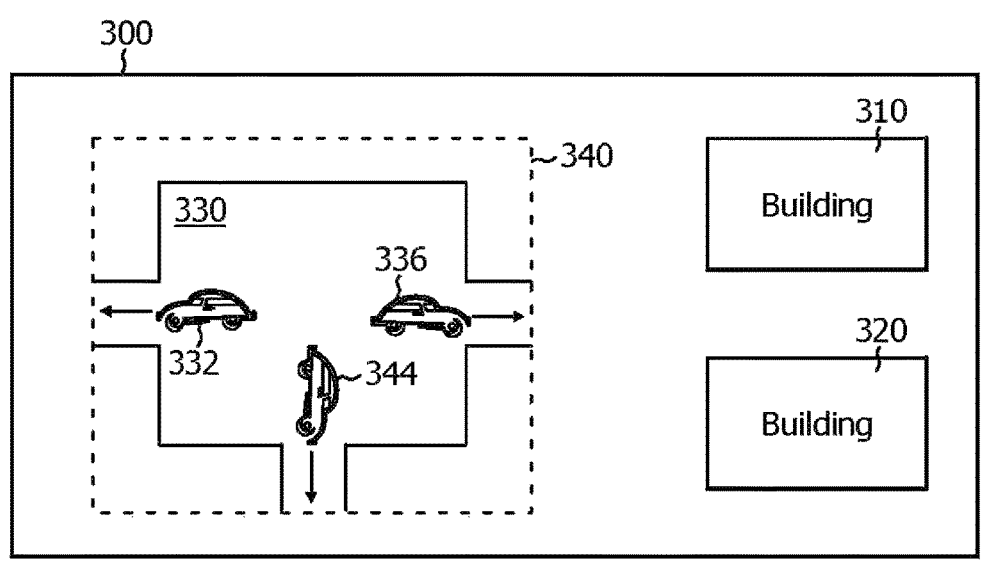

The foregoing and other objects, aspects and advantages will be better understood from the following detailed description of embodiments of the inventions, with reference to the drawings, in which:

FIG. 1 is a schematic block diagram of a video monitoring system that implements a novel video analytics function of the invention FIG. 2 is a schematic representation of a FOV acquired in streaming video from a video source showing an object and object field definition, and includes moving people; and FIG. 3 is a schematic representation of a FOV acquired in streaming video from a video source showing an object and object field definition, and includes moving vehicles.

DETAILED DESCRIPTION OF THE INVENTION

The inventive video surveillance system, method and novel video analytics function of the invention are described herein with the accompanying drawings in order to convey the broad concepts of the invention. The drawings figures and textual descriptions however, are meant for illustrative purposes only, and are not meant to limit the scope and spirit of the invention, or in any way limit the scope of the invention as claimed.

The inventive video surveillance system, method and novel video analytics function of the invention provides an end-user with an ability to monitor objects, or specific areas, for example, low threat areas, within a particular field of view (FOV) acquired by a video source differently, much more efficiently with respect to both bandwidth and system processing load by controlling the compression ratio of the identified objects or identified areas. The end-user must first identify the object or area that he/she wishes to seclude in compression with respect to the other video data comprising the streaming FOV. The identification of objects or other specific area elements in the FOV by an end-user is accomplished by the invention using any known user input device that would allow the user to capture the object or area on a screen where the streaming video comprising the FOV is displayed. The end-user captures the object or specific area by completely enclosing same in a free form or geometric-shaped boundary, defining an object or area field ("object field"), in a form of an object field definition. The user then sets the compression level for the defined object field. The compression ratio or level may be varied depending on the priority for monitoring the object in the surveillance application, including a fully masked mode of compression, at the user's discretion.

Limiting the video data transmitted from the video source has a commensurate value with respect to system bandwidth and loading requirements in that only the limited video data need be transferred to and processed at its destination. That is, there is a marked benefit of such operation in bandwidth savings commensurate with the percentage of the FOV compressed, and the compression ratio of the percentage. Reducing data for network or system transfer and processing also realizes a reduced system video-processing load. Where an object field definition is fully masked, and it comprises 20% of an FOV, there would result in an approximately 20% reduction in bandwidth required to transmit the streaming video data comprising the FOV. Moreover, the reduced video data realizes a reduction in load for a similar percentage in view of the fact that it is only analyzing approximately 80% of the video data from the FOV. In this way, the end-user monitoring the FOV is more able to focus on the FOV portions other than the object field.

One embodiment of a video surveillance system 100 of the invention is depicted in FIG. 1. The reader and skilled artisan alike should recognize that the FIG. 1 system 100 is presented for exemplary purposes only, to provide an understanding of the inventive principles, but is not meant to limit the invention in any way. Video surveillance system 100 includes a video manager 110 that performs video analytics processing on video data forwarded to it from any of video sources 120 via video analytics server 130, from any of video sources 140 that include onboard video analytics processing ability (sometimes referred to as "smart" video sources (cameras)), and video sources 150. Video sources 150 may or may not include onboard video analytics processing abilities. An optional data translation rules database 160 is also shown connected to the video manager 110. The video sources provide acquired video data streams that may include attached metadata in various formats, including movement or motion vectors characterizing the object field(s). Video manager 110 is also connected to an other resources database 170, and a user interface 175 for end-user operation of the user-controlled novel video analytics function of the invention. User interface 175 is shown in FIG. 1 to include a personal computer 180, display 185 and input device 190.

The video analytics function, or functional module for implementing the novel video monitoring operation may be located in a smart video source with onboard video analytics ability (140), in a video analytics server (130) for maintaining streaming video from basic video sources 120, the video manager 110 to maintain video throughput and processing for network video sources 150, the PC 180 in user interface 175, and/or in the other resources including an NVR or DVR (170) as shown. The user interface may include computer software that implements the novel function and system operation, for example, by including a set of computer readable instructions that upon execution at the user interface carry out the novel function.

An explanation of how the novel function operates for monitoring applications will be explained with reference to the hypothetical streaming field of view (FOV) 200 of FIG. 2, FOV 200 acquired by any video source available and known in the conventional arts, such as depicted in the FIG. 1 system 100. Again, whether the novel video analytics unction is located and operational in the video source providing the streaming FOV, or in a system video manager, a DVR that supports system operation, or a PC that supports system video processing and distribution, such function provides an end-user (at a user interface not shown in FIG. 2) the ability of identify objects and areas in the FOV 200, such as building 210, and avoid the need for transferring the video data comprising the object, and processing the video data as it would be processed in the conventional arts. Identification includes using an input device (for example, at user interface 175 of FIG. 1) to enclose the object, or desired area within the FOV with an object boundary, or object field definition 220. The reader should note that the object field definition is not dependent on the actual object boundary, but may capture the actual object boundary, and/or a perimeter around the object (as shown) for various monitoring operations.

And as mentioned above, the object field definition is not limited by the invention to objects per se, but to specific areas that once identified are defined as area fields, which are equivalent of an object field definition. For that matter, the terms "area field definition," and object field definition are used interchangeably herein to convey the concept of a captured portion of a streaming video field of view, for purposes of minimizing the video data forwarded from the source tracking the area, field or object.

In the instant example of FIG. 2, two structures, 230 and 240 have a high-priority for monitoring, where building 210 has a very low priority. The user, therefore, may choose implement the novel function with respect to the low priority object (building 210). The end-user may first capture the object, by enclosing the object (or other area) in an object field definition. Then the entire object field so captured may then be compressed, or fully masked (object field 220), in accordance with the system limitations by the novel function so that the video data from the portion of the FOV comprising object or area field 220 is minimized commensurate with the compression ratio. Where an object field is fully masked, as distinguished from compressed to a specific compression level, the fully masked data are not transferred and processed as are the video data comprising the remainder of the FOV. Whether fully masked or compressed to various states of compression, the result is a reduction of data transferred from the video source for the streaming FOV, and a reduction in processing load by the system, e.g., at the IP address slated for processing or storing the streaming video data.

Other than as fully masked, some video data at the defined compression level for the object field is processed and monitored for movement in the object field, or in a filed that lies just outside the building boundaries (an outlier region just outside an enclosed object or area field definition). At movement detection, the system may be controlled to automatically modify the compression level of the object field definition. For example, in a compressed mode, the video analytics function may nevertheless discern movement of any of the four (4) people, 222, 224, 226 and 228. Based on the movement, or movement direction, the function may automatically modify the compression ratio back to a default compression ratio. Automatic default operation may be controlled by user settings. This is particularly helpful if an object is a human, where any object movement cause the novel function to automatically revert to full video of same object (person). In a case where the object moving is non-human, such as a motor vehicle, the user is preferably noticed of the object's movement, and is provided with an option of changing the compression level, or masking.

Hence, in an application such as highlighted in FIG. 2, where the object is a person 228 moving away from buildings 230 and 240, the novel function will not identify him/her as a possible threat, so not change the compression level for the object field. That is, no need to change monitoring priority in the object field in view of the movement of person 228, based on the novel function's motion vector analysis (described in greater detail below), including identifying respective motion direction. The same is true for person 226, who is shown moving away from the buildings. But person 224 in the actual object (in the object field definition) and person 222, who is outside the object, but in the object field, are seen moving away from the object towards the buildings. The novel function will modify the compression to get the maximum resolution in response to the direction traveled, or change in direction of travel.

Identifying the direction of movement of an object (e.g., person) may also be carried out by the invention even if the object definition is fully masked, because the movement is derived not from analyzing the video data defining the object field directly, but by analyzing a motion tracking vector. The motion tracking vectors are derived from and representative of movement within the user-defined object field. Not only does this novel functional operation reduce the amount of data that must be transferred (bandwidth) to carry out the video monitoring, but also reduces the load on system video processing resources because they need not fully process the identified and compressed object video data.

FIG. 3 depicts another hypothetical FOV 300, in which there are two buildings 310 and 320, which have a high monitoring priority, and an object 330 is a parking lot proximate buildings (objects) 310 and 320. Again, and as already mentioned, the terms area and object are used interchangeably, such that the parking lot area is essentially a defined object field. That is, parking lot 330 is shown enclosed by a user-defined object field definition or boundary 340. The video data of the streaming video FOV that comprises parking lot 330 and the space outside the lot in the object field definition 340 is compressed by end-user input control. The object definition may be defined for fully masked or partially compressed monitoring operation within the FOV 300 depending on the end-user definition. The parking lot 330 in object field 340, and cars shown therein are defined as low-priority, or low threat. But the threat level of cars in the object field may change based on the motion vectors relating to same. For example, while cars 332 and 334 are shown moving away from the buildings 310 and 320, their movement alone will not trigger the system, and the novel function, to modify the threat level and therefore the compression level of the streaming video from the object (parking lot 330). It is the direction of the movement towards the buildings, such as by car 336 that will result in a change of monitoring of the FOV 300, and in particular the object field, and in accordance with a specifically controlled monitoring application.

If analysis of a motion vector relating to car 336 identifies movement towards the high-priority buildings 310, 320 (when operating in fully masked mode). The movement may be detected as seen from the object 330 or in the boundary outside of object 330 but still within object field 340. Based on the motion vector, the system may automatically change back to a default compression level for the object (parking lot 330). Preferably, however, for particularly defined object fields, detected movement will present to the end user notification of the movement, and an option to modify the compression level for subsequent streaming video containing the object field. Of course the user could then decide how much compression is necessary in view of the detected threat to maintain the proper level of monitoring protection in the FOV and object field. By monitoring for movement, directional changes of movement, or object velocity changes, etc., and/or by monitoring the object motion vector, the threat level or compression level of the video comprising the object field is automatically modified in response to the detected movement.

To that end, the novel video analytics function may identify the compressed object field, and its compression level using various metadata attributes. For example, there could be a scale defining the priority of objects to the surveillance needs. Any number of bits could be used to indicate the priority of the object, for example, 3 bits would provide a priority scale of 0 to 7. Any means for minimizing the amount of data that must be transferred, and analyzed optimizes overall security operation.

As indicated hereinabove, it should be understood that the present invention could be realized in hardware, software, or a combination of hardware and software. Any kind of computer/server system(s)—or other apparatus adapted for carrying out the novel optimization methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embodied in a computer program product, which comprises all the respective features enabling the implementation of the methods described herein, for example, the exemplary methods depicted in the figures herein, and which product—when loaded in a computer system—is able to carry out these and related methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A video analytics function for streaming video from a video source arranged to monitor a field of view (FOV) that modifies a compression level of an object of interest ("object") within the FOV, the video analytics function embodied as a set of instructions on a non-transitory computer readable medium, the video analytics function executable by a computer and implementing the following steps:
    reconstructing the FOV comprising the streaming video for viewing at an end-user interface;
    receiving end-user commands at the end-user interface to define an object field encompassing the object within the FOV based on a monitoring priority for the object;
    defining the compression level for the object including partial compression or full compression that fully masks the object;
    compressing the streaming video within the object field according to the compression level;
    monitoring the FOV of the streaming video;
    analyzing first data associated with the FOV of the streaming video for a detectable event including movement and a direction of a person in the FOV; and
    automatically decreasing the compression level of the object field in response to a detected event, wherein the detected event includes the movement of the person within the object field.

2. The video analytics function as set forth in claim 1, wherein monitoring the FOV includes monitoring a motion vector in the object field.

3. The video analytics function as set forth in claim 1, wherein receiving the end-user commands includes identifying the object by enclosing the object with the object field in the FOV using the end-user interface.

4. The video analytics function as set forth in claim 3, wherein receiving the end-user commands includes receiving input that defines the compression level of the object field.

5. The video analytics function as set forth in claim 1, further comprising notifying an end-user where the movement is detected in the object field.

6. The video analytics function as set forth in claim 5, wherein the end-user, upon notification of the movement in the object field, is provided with an option to modify the compression level of the object field.

7. The video analytics function as set forth in claim 5, further comprising, upon notification of the movement in the object field, automatically decreasing the compression level for the object field to a system default level or a user-defined default level.

8. A video surveillance system for monitoring a field of view (FOV), comprising:
    a video source for acquiring streaming video from the FOV;
    a video analytics function; and
    a user interface in communication with the video source and the video analytics function,
    wherein the video analytics function receives identification from an end-user via the user interface of an object in the FOV, thereby defining an object field surrounding the object within the FOV, and a compression level for first video data comprising the object field,
    wherein the compression level of the object field is selected from a range of compression levels that includes fully masking the object field,
    wherein the object field within the streaming video is compressed according to the compression level, and
    wherein the video source monitors movement and a direction of a person within the FOV with respect to the object field and automatically decreases the compression level for the object field based upon the movement within the object field.

9. The video surveillance system as set forth in claim 8, wherein the video source includes on-board video analytics that are controlled via the user interface to define the object field and the compression level.

10. The video surveillance system as set forth in claim 9, wherein the video analytics function generates metadata representative of a feature of data content of the object field.

11. The video surveillance system as set forth in claim 8, wherein the compression level corresponds to a threat level or a monitoring priority of the object or the object field.

12. The video surveillance system as set forth in claim 8, wherein the user interface includes a video monitor, a keyboard, a mouse, a trackball, a penlight, a joystick, a telephone, or a cell phone.

13. The video surveillance system as set forth in claim 12, wherein the user interface receives a definition of the object field by the end-user enclosing an area that bounds the object.

14. The video surveillance system as set forth in claim 8, further comprising a system video manager for managing system video sources, wherein the system video manager includes on-board video analytics that are controlled via the user interface to define the object field and the compression level.

15. The video surveillance system as set forth in claim 14, wherein the system video manager is in electrical communication with the user interface and the video source for processing the streaming video including the FOV with the object field.

16. The video surveillance system as set forth in claim 8, wherein the first video data comprising the object field is analyzed for the movement in a compressed state, and, when the movement is detected, the end-user is alerted.

17. The video surveillance system as set forth in claim 16, wherein, when the movement is detected in the object field, the video analytics function automatically decreases the compression level to a system default compression value for the FOV.

18. The video surveillance system as set forth in claim 17, wherein a motion vector characterizing the object field is analyzed for the movement in the object field.

19. The video surveillance system as set forth in claim 17, wherein the system default compression value provides that the first video data comprising the object field is not compressed.

20. The video surveillance system as set forth in claim 16, wherein, when the movement is detected in the object field, the video analytics function automatically notifies the end-user and provides the end-user with an option to decrease the compression level to an end-user defined compression value for either the object field or the FOV.

21. A video surveillance method for monitoring streaming video from a video source arranged to monitor a field of view (FOV), the video surveillance method comprising the steps of:

reconstructing the FOV for viewing at a user interface the streaming video comprising the FOV acquired and forwarded by the video source to the user interface;

receiving first end-user commands at the user interface to create an object field enclosing an object within the FOV;

receiving second end-user commands at the user interface that define a compression level of the object field from a range of compression levels including fully masking the object field, wherein the compression level reflects a monitoring priority;

compressing the object field within the streaming video according to the compression level;

monitoring the FOV for motion and for a direction of a person with respect to the object field; and automatically decreasing the compression level of the object field upon detection of the motion within the object field.

22. The video surveillance method as set forth in claim 21, further comprising automatically notifying an end-user that the monitoring priority changed when the motion is detected in the object field.

23. The video surveillance method as set forth in claim 21, wherein monitoring the FOV includes monitoring a motion vector associated with the object or the object field.

* * * * *